United States Patent
Yasukawa (10) Patent No.: US 8,976,390 B2
(45) Date of Patent: Mar. 10, 2015

(54) IMAGE PROCESSING APPARATUS HAVING STORAGE UNIT THAT STORES SETTING VALUES, AND CONTROL METHOD AND STORAGE MEDIUM THEREFOR

(71) Applicant: Canon Kabushiki Kaisha, Tokyo (JP)

(72) Inventor: Takuma Yasukawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/751,331

(22) Filed: Jan. 28, 2013

(65) Prior Publication Data

US 2013/0215461 A1     Aug. 22, 2013

(30) Foreign Application Priority Data

Feb. 17, 2012   (JP) ................................ 2012-032759

(51) Int. Cl.
*G06F 3/12*     (2006.01)
*H04N 1/00*    (2006.01)

(52) U.S. Cl.
CPC ....... *H04N 1/00912* (2013.01); *H04N 1/00408* (2013.01); *H04N 1/0097* (2013.01)
USPC ......................................... 358/1.15; 358/1.1

(58) Field of Classification Search
None
See application file for complete search history.

(56) References Cited

U.S. PATENT DOCUMENTS

| | | | | |
|---|---|---|---|---|
| 8,035,858 B2 * | 10/2011 | Matoba | .......................... | 358/2.1 |
| 8,289,877 B2 * | 10/2012 | Turcanu et al. | ............... | 370/254 |
| 8,310,711 B2 * | 11/2012 | Nakawaki | ..................... | 358/1.16 |
| 8,508,761 B2 * | 8/2013 | Hirakawa | ..................... | 358/1.14 |
| 8,553,261 B2 * | 10/2013 | Okada | .......................... | 358/1.15 |
| 8,553,262 B2 * | 10/2013 | Hayashi et al. | ............... | 358/1.15 |
| 2008/0079659 A1 * | 4/2008 | Kunita et al. | ..................... | 345/4 |
| 2009/0251729 A1 * | 10/2009 | Nakawaki | ..................... | 358/1.15 |
| 2010/0027048 A1 * | 2/2010 | Aritomi et al. | ............... | 358/1.14 |
| 2010/0050175 A1 * | 2/2010 | Jung et al. | ..................... | 718/100 |
| 2010/0228883 A1 * | 9/2010 | Takagi | .............................. | 710/4 |
| 2011/0002007 A1 * | 1/2011 | Okada | .......................... | 358/1.15 |
| 2011/0019229 A1 * | 1/2011 | Hayashi et al. | ............... | 358/1.15 |
| 2011/0164271 A1 * | 7/2011 | Kamimura | .................... | 358/1.14 |
| 2011/0261397 A1 * | 10/2011 | Marunouchi | ................ | 358/1.15 |
| 2013/0010626 A1 * | 1/2013 | Turcanu et al. | ............... | 370/252 |

FOREIGN PATENT DOCUMENTS

| | | | |
|---|---|---|---|
| JP | 2007-036701 A | | 2/2007 |
| JP | 2011-049850 A | | 3/2011 |

* cited by examiner

*Primary Examiner* — Marcus T Riley
(74) *Attorney, Agent, or Firm* — Rossi, Kimms & McDowell LLP (57) ABSTRACT

An image processing apparatus having improved user-friendliness in setting the setting values that represent contents of operation to be performed by the image processing apparatus. In a case that a login user has changed at least one setting value during the login, a CPU of the image processing apparatus causes a SRAM to store a setting value before change corresponding to the changed setting value. When the user logs out, the setting value changed by the user during the login is returned to the setting value before change that is stored in the SRAM.

13 Claims, 9 Drawing Sheets

IMAGE PROCESSING APPARATUS HAVING STORAGE UNIT THAT STORES SETTING VALUES, AND CONTROL METHOD AND STORAGE MEDIUM THEREFOR

BACKGROUND OF THE INVENTION

1. Field of the Invention

The present invention relates to an image processing apparatus having a storage unit for storing setting values, a control method therefor, and a storage medium storing a program for executing the control method.

2. Description of the Related Art

An image processing apparatus such as a copier or a multifunction peripheral has a storage unit that stores setting values representing contents of operation to be performed by the apparatus, and the image processing apparatus operates according to the setting values. These setting values can be changed by a general user or by a management user having administrator authority.

For example, in an image processing apparatus, a display language is set to a language familiar to a user, and the set display language is used for display on an operation panel screen. Further, an initial screen is set, which is selected from among various screens for copy, transmission, FAX, etc., and the set initial screen is displayed at startup of the apparatus. Furthermore, it is possible to set an auto-clear time for a setting value, e.g., a number of sets of copies. In that case, after elapse of a predetermined auto-clear time from completion of operation of the apparatus performed according to the setting value (e.g., copy operation according to a predetermined number of sets of copies), the setting value is automatically cleared to prevent inconveniences such as wasteful copy from occurring when the apparatus is subsequently used by another user.

In some PC, profiles for individual users are prepared. When a user logs in, the PC operates according to the profile of the login user to enable the user to utilize an environment customized by the user.

On the other hand, in an image processing apparatus whose storage unit is limited in capacity, setting values are generally set and stored not for each individual user but for each individual apparatus. It should be noted that in some image processing apparatus, setting values changeable only by a management user are stored in the storage unit separately from setting values that can be changed by general users.

Even in an image processing apparatus whose setting values are set and stored not for each user but for each apparatus, each user is able to enhance the user-friendliness of the apparatus by changing the setting values as needed. However, this can cause inconveniences for other users. In a case, for example, that a special display language is set by some user, subsequent display is made in that language that cannot be understood by other users, resulting in confusion.

To obviate this, Japanese Laid-open Patent Publication No. 2007-036701 discloses an information processing apparatus that receives and stores information set to another information processing apparatus, operates in an operational environment based on the stored information when a user who requests to access the stored information is successfully authenticated, and deletes the stored information when the user logs out. Japanese Laid-open Patent Publication No. 2011-49850 discloses an authentication system that optimizes an initial display screen of a multi-function peripheral at the time of login to the multi-function peripheral to enhance the user-friendliness by changing the initial display screen according to a final display screen at the time of preceding logout.

However, when the technique disclosed in Japanese Laid-open Patent Publication No. 2007-036701 is applied to an image processing apparatus, the resultant system becomes large in scale as a whole, and therefore unsuitable in an environment in which one or a small number of image processing apparatuses are used.

When an initial display screen is changed according to a final display screen at the time of preceding logout as disclosed in Japanese Laid-open Patent Publication No. 2011-49850, the display screen at the preceding logout is automatically displayed at the time of login. Accordingly, the display screen must be re-configured in some cases, and hence the user-friendliness is not necessarily improved.

In the aforesaid image processing apparatus in which setting values changeable by general users and setting values changeable by only the management user are stored separately from each other, one or more setting values changed by the management user for management purpose can be changed by a general user, if these setting values are changeable even by general users. This poses a problem that the management intended by the management user cannot be achieved.

SUMMARY OF THE INVENTION

The present invention provides an image processing apparatus having improved user-friendliness in setting the setting values that represent contents of operation to be performed by the image processing apparatus, a control method therefor, and a storage medium storing a program for executing the control method.

According to one aspect of this invention, there is provided an image processing apparatus comprising a storage unit configured to store at least one setting value that represents an operation mode of the image processing apparatus and configured, in a case where the setting value is changed by a user, to store as a setting history a history that represents a change of the setting value, a log-in processing unit configured to enable a user to log in to the image processing apparatus, a determination unit configured, in a case where the user is enabled by the log-in processing unit to log in to the image processing apparatus, to determine whether or not the login user has changed in the past the setting value stored in the storage unit, an obtaining unit configured, in a case where it is determined by the determination unit that the login user has changed in the past the setting value stored in the storage unit, to obtain the setting value corresponding to the login user from the storage unit, and a setting unit configured to set a current operation mode of the image processing apparatus based on the setting value obtained by the obtaining unit.

With this invention, it is possible to improve the user-friendliness in setting the setting values that represent contents of operation to be performed by the image processing apparatus.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
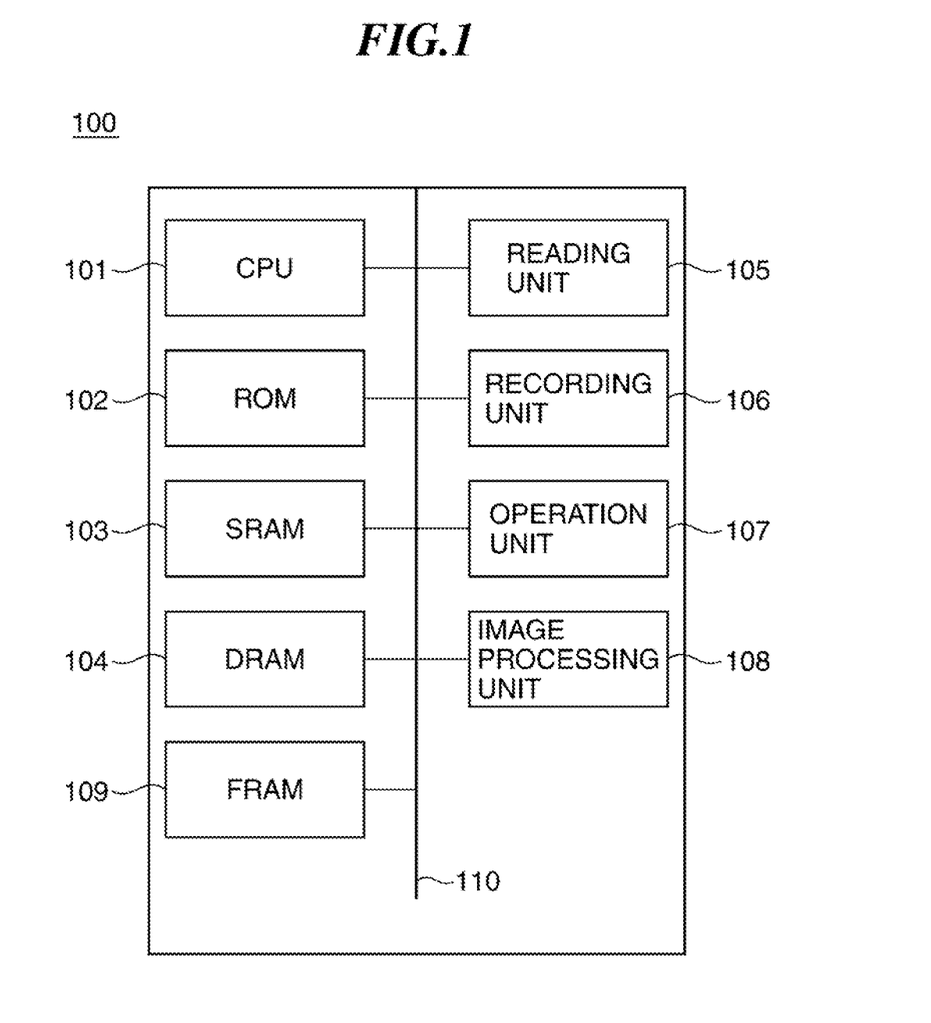
FIG. 1 is a block diagram schematically showing the construction of an image processing apparatus according to one embodiment of this invention.

FIG. 1 schematically shows in block diagram the construction of an image processing apparatus according to one embodiment of this invention.

As shown in FIG. 1, the image processing apparatus 100 of this embodiment includes a CPU 101 that controls the entire image processing apparatus 100. A ROM 102 is stored with a control program for the CPU 101, a SRAM 103 (storage unit) is stored with setting values that represent contents of operation to be performed by the image processing apparatus 100, management data for divisions of a company, etc., and a DRAM 104 is stored with program control variables and the like. The SRAM 103 is also used as a work buffer and is battery backed up.

A reading unit 105 includes an automatic double-sided original feeder by which an original can be fed to a reading position where a front face of the original is read and can be reversed from front to back and fed to the reading position where a back face of the original is read.

A recording unit 106 outputs image data on a recording sheet. An operation unit 107 has a display screen on which information relating to the image processing apparatus 100 is displayed and on which soft keys for use by a user to give instructions to the image processing apparatus 100 are displayed, and has hard keys for use by the user to give instructions to the image processing apparatus 100.

An image processing unit 108 performs encoding/decoding processing and variable magnification processing on image data. A FRAM (registered trademark) 109 is stored with counter values for accounting and for division management, such as the number of read faces and the number of output faces.

The aforementioned elements 101 to 109 of the image processing apparatus 100 are connected to one another through a data bus 110.

In the image processing apparatus 100 having the above-described construction, the reading unit 105 feeds an original to the reading position and reads an image of the original, and the resultant image data is temporarily stored into a nonvolatile memory (e.g., the SRAM 103) and printed by the recording unit 106. Various settings of the image processing apparatus 100 can be set by a user by operating the operation unit 107. In a case, for example, that double-sided reading is set in copy settings, both sides of an original are sequentially read by the reading unit 105 and image data is stored into the nonvolatile memory and printed by the recording unit 106.

Figure 2:
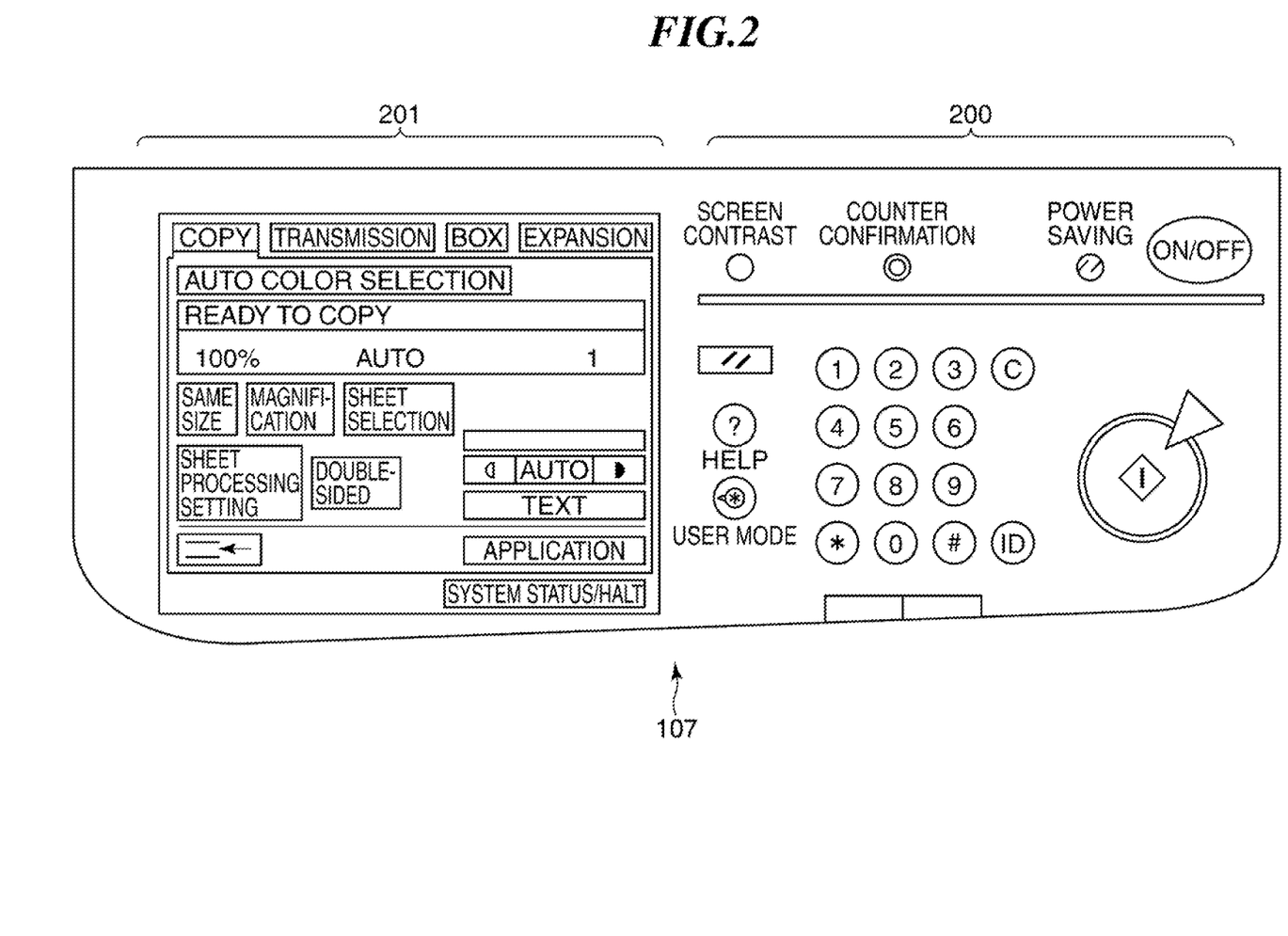
FIG. 2 is a plan view showing the construction of an operation unit of the image processing apparatus.

FIG. 2 shows the construction of the operation unit 107 of the image processing apparatus 100.

As shown in FIG. 2, the operation unit 107 includes a key input device 200 having hard keys and includes a touch panel device 201 on which soft keys are displayed.

Figure 3:
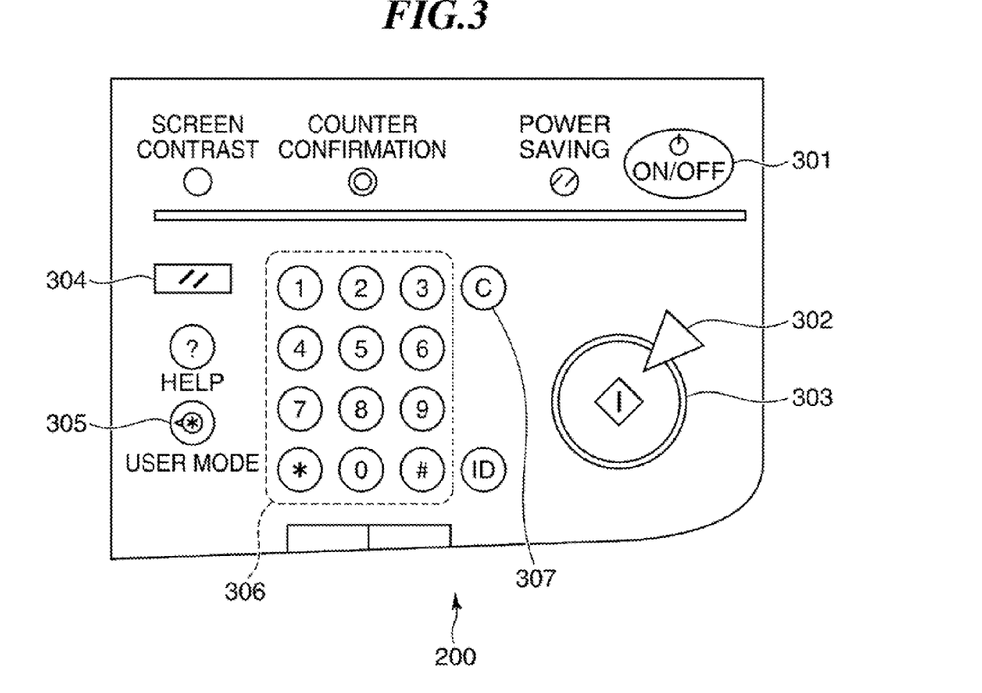
FIG. 3 is a plan view showing hard keys of a key input device of the operation unit.

FIG. 3 shows the hard keys of the key input device 200.

As shown in FIG. 3, the key input device 200 includes switches 301 to 307 that are operated by a user. In response to a user's operation on an operation unit power switch 301, the CPU 101 changes the operation mode of the image processing apparatus 100 between a standby mode and a sleep mode in which, e.g., a display operation of the touch panel device 201 is stopped for reduction of power consumption.

A start key 303 is operated to give the image processing apparatus 100 an instruction to start a job to be processed, such as a copy operation or a transmission operation.

A stop key 302 is operated to give the image processing apparatus 100 an instruction to stop processing the job. Ten keys 306 are operated to input setting values.

A clear key 307 is operated to cancel parameters. A reset key 304 is operated to give an instruction to nullify settings set for the job to be processed and to return the setting values to default.

A user mode key 305 is operated to shift to a system setting screen on which various settings can be set by the user. For example, display language, initial functions, auto-clear time, etc. can be set in common settings, density can be set in printer settings, and color/file format (such as JPEG or TIFF), resolution, etc. can be set in communication settings. Network setting, division management setting, etc. can be set with management user's authority.

Figure 4:
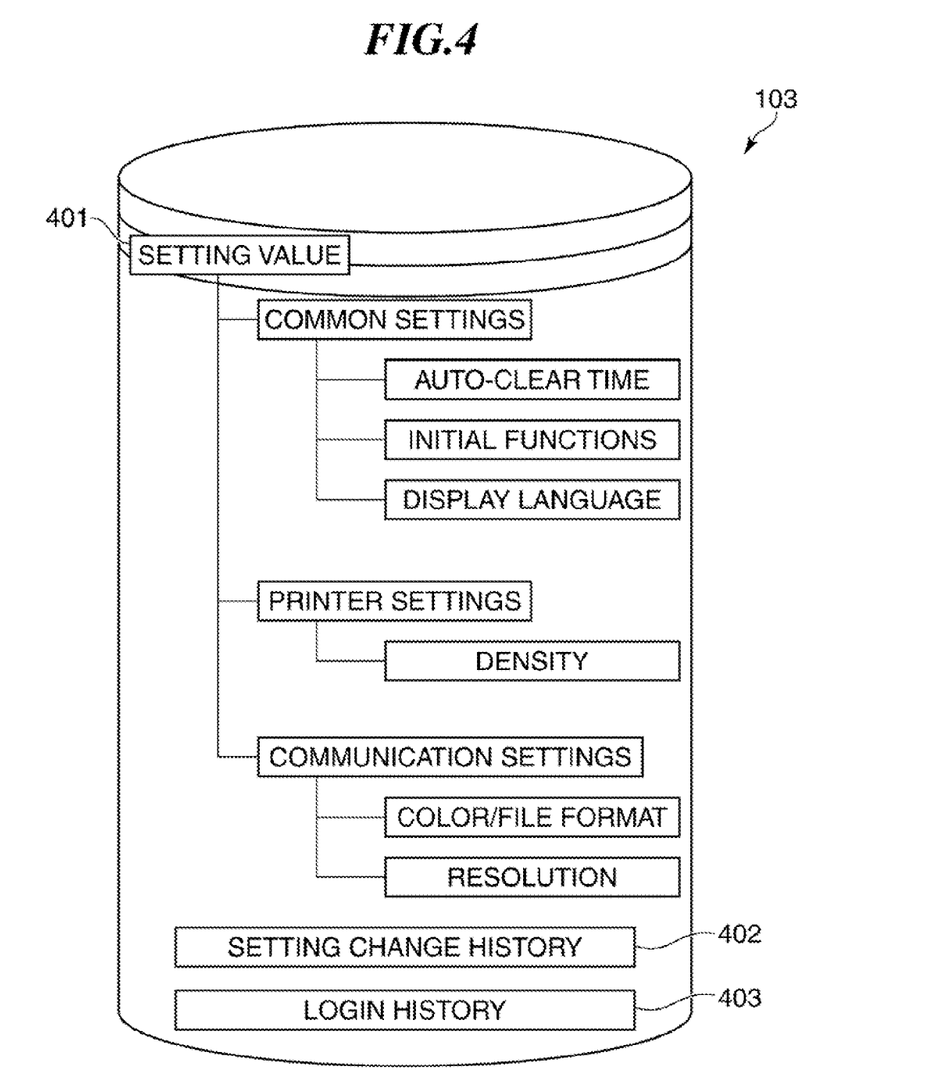
FIG. 4 is a view showing an example of setting-related data stored in a SRAM of the image processing apparatus.

FIG. 4 shows an example of setting-related data stored in the SRAM 103 of the image processing apparatus 100.

As shown in FIG. 4, the setting-related data includes setting values 401, a setting change history 402, and a login history 403.

The setting values 401 include setting values set in the common settings, printer settings, communication settings, etc. These setting values can each be changed on a per user basis in a user mode. The setting change history 402 represents a change history of setting values for each user. The login history 403 represents a login history for each user. In this manner, setting values set by users are stored in the SRAM 103 on a per user basis. It is possible for the CPU 101 of the image processing apparatus 100 to select, based on e.g. an identifier that identifies a login user, setting-related data associated with the login user from among setting-related data for users and to refer to the selected data.

It should be noted that in this embodiment, setting-related data is stored in the SRAM 103, which is a battery backed-up RAM as previously described, however, it can be stored in a nonvolatile memory other than the battery backed-up RAM.

Figure 5:
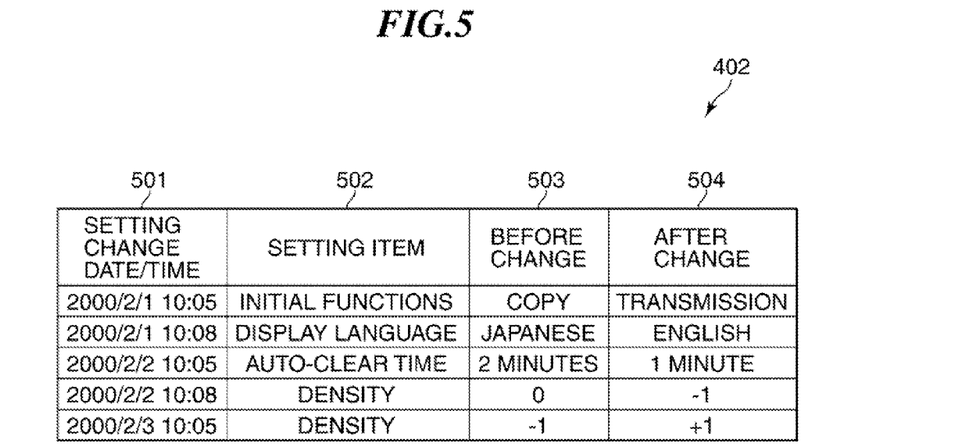
FIG. 5 is a view showing an example of a setting change history stored in the SRAM.

FIG. 5 shows an example of the setting change history 402, which is stored in the SRAM 103.

As show in FIG. 5, the setting change history 402 includes one or more records. The records each include a setting change date/time field 501 held with information that represents a date and time where a setting was changed, a setting item field 502 held with information that represents a changed setting item, a before change field 503 held with a setting value before change (e.g., a setting value set in the user mode), and an after change field 504 held with a setting value after change. In the illustrated example, it is shown that the display language was changed from Japanese to English at the date and time of Feb. 1, 2000 at 10:08 AM, the auto-clear time was changed from 2 minutes to 1 minute at the date and time of Feb. 2, 2000 at 10:05 AM, and so on.

Figure 6:
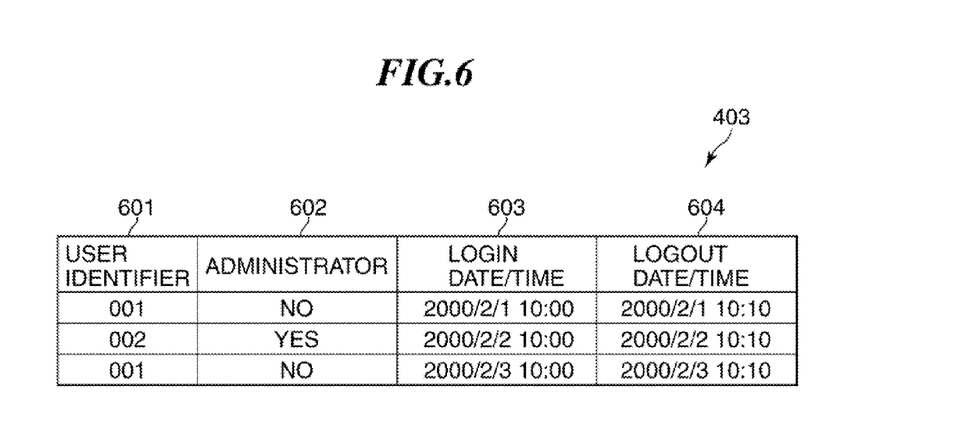
FIG. 6 is a view showing an example of a login history stored in the SRAM.

FIG. 6 shows an example of the login history 403 stored in the SRAM 103.

As shown in FIG. 6, the login history 403 includes one or more records. The records each include a user identifier field 601 held with a user identifier that identifies a login user, an administrator field 602 held with information that represents whether or not the login user is an administrator, a login date/time field 603 held with login date/time information, and a logout date/time field 604 held with logout date/time information.

Information "YES" in the administrator field 602 represents that the login user is an administrator who has administrative authority, whereas information "NO" represents that the login user is not an administrator but is a general user.

In the following, a description will be given of three types of setting management processes according to this embodiment. It should be noted that programs for executing these setting management processes are stored in the ROM 102.

Figure 7:
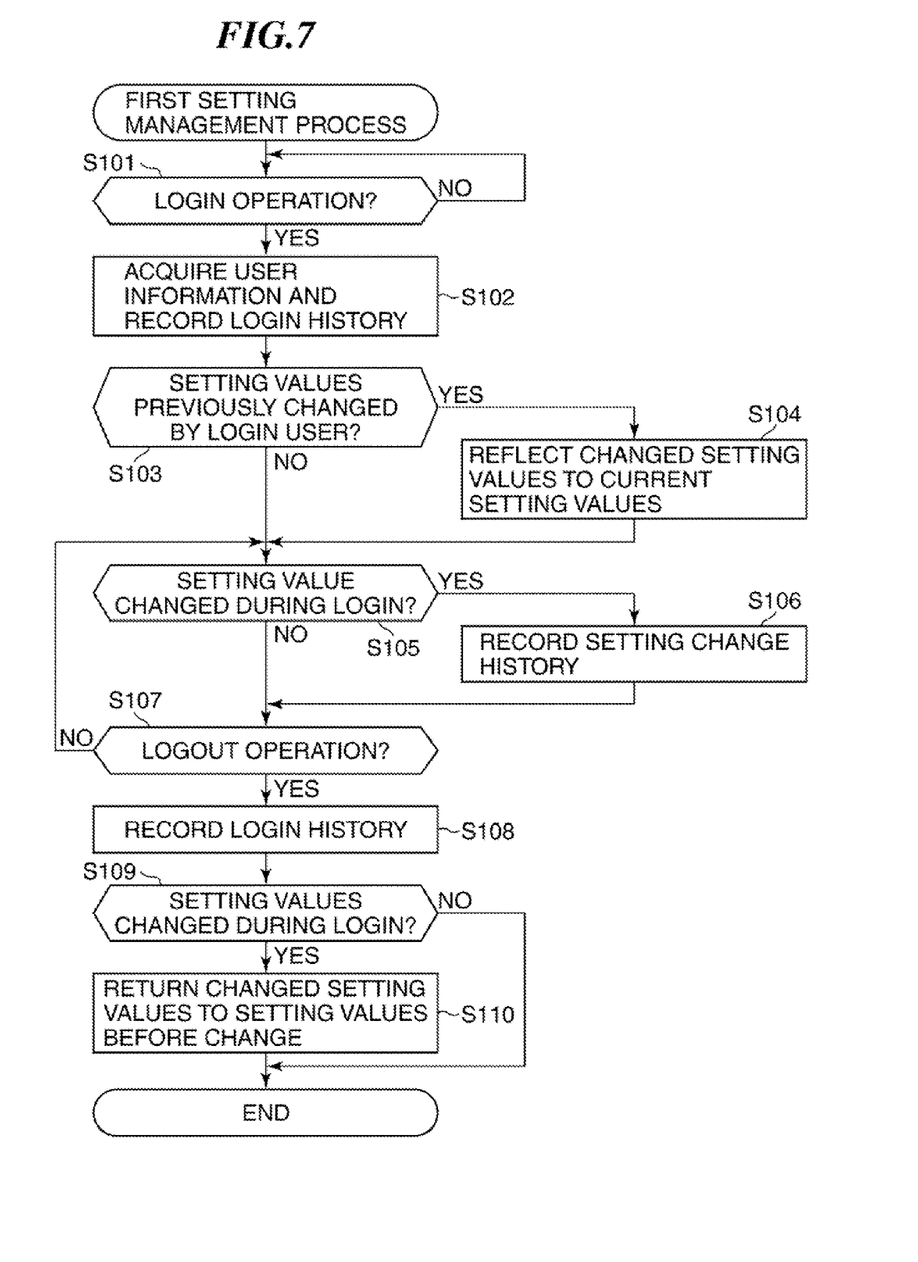
FIG. 7 is a flowchart showing the procedures of a first setting management process executed by a CPU of the image processing apparatus.

FIG. 7 shows in flowchart the procedures of a first setting management process executed by the CPU 101 of the image processing apparatus 100.

Referring to FIG. 7, when a login operation is performed by a user (YES to step S101), the CPU 101 acquires user information (e.g., user identifier) that has been input by the user through the operation unit 107 of the image processing apparatus 100 at the time of login operation. Next, the CPU 101 adds a new record to the login history 403, records the acquired user identifier into the user identifier field 601 of the new record, records into the administrator field 602 information representing a result of determination to determine whether the login user is an administrator based on, e.g., the acquired user identifier, and records into the login date/time field 603 current date/time information acquired from a non-illustrated clock circuit, which is built in the CPU 101 (step S102).

Next, based on the setting change history 402, the CPU 101 determines whether or not one or more setting values have been changed by the login user during the previous login (step S103).

More specifically, based on the user information acquired in step S102, the CPU 101 first identifies the user who is currently logging in, and determines whether or not the user has logged in to the image processing apparatus 100 in the past while referring to information held in the login history 403 stored in the SRAM 103. In the example of FIG. 6, if the user currently logging in to the image processing apparatus 100 is identified by the user identifier 001 or 002, it is determined that the current login user has logged in the past.

Next, the CPU 101 identifies a login time period during which the current login user has logged in in the past. In the example of FIG. 6, the login time period is identified as being from 10:00 AM to 10:10 AM of Feb. 2, 2000 for the user who is identified by the user identifier 002.

Next, the CPU 101 acquires a change history recorded at a time belonging to the login time period from the setting change history 402 stored in the SRAM 103. In the example of FIG. 5, the auto-clear time was changed from 2 minutes to 1 minute and the density setting was changed from 0 to −1 in the time zone from 10:00 AM to 10:10 AM of Feb. 2, 2000, and accordingly, it is determined that the user identified by the user identifier 002 has changed the auto-clear time and the density setting in the past.

In accordance with the above-described procedure, the CPU 101 determines whether or not the current login user has changed in the past one or more setting values stored in the storage unit 103.

If the answer to step S103 is YES, the CPU 101 changes setting values so as to reflect the one or more setting values, which have been changed by the login user during the previous login, to the current setting values, and sets the setting values after change as a current operation mode setting (step S104), and proceeds to step S105. It should be noted that although not shown in FIG. 7, the image processing apparatus 100 performs an original reading operation to read an image of an original, an image forming operation to print the image on a sheet, etc. in the operation mode determined based on the setting values associated with the login user.

On the other hand, if setting values have not been changed by the login user during the previous login (No to step S103), the CPU 101 determines whether or not the login user changes a setting value during the current login (step S105).

If the answer to step S105 is YES, the CPU 101 records the setting change date/time, changed setting item, setting value before change, and setting value after change in respect of the changed setting value into respective ones of the setting change date/time field 501, setting item field 502, before change field 503, and after change field 504 of the setting change history 402 (step S106). Then, the flow proceeds to step S107.

It should be noted that even if it is determined in step S105 that a setting value is changed by the login user during the current login, it is possible not to record a change history of the setting value as the setting change history 401 or not to reflect the change history of the setting value to the history 401 in a case that an original reading operation and/or an image forming operation based on the setting value after change is erroneously completed.

Step S106 corresponds to a control unit of this invention that causes a storage unit (e.g., SRAM 103) to store a setting value before change in a case where a setting value is changed by a user who is logging in to the image processing apparatus 100.

On the other hand, if the login user does not change a setting value (NO to step S105), the CPU 101 determines whether or not a logout operation is performed by the user (step S107).

If a logout operation is not performed by the user (NO to step S107), the flow returns to step S105. On the other hand, if a logout operation is performed by the user (YES to step S107), the CPU 101 records logout date/time information into the logout date/time field 604 of the login history 403 (step S108).

Next, the CPU 101 determines whether or not one or more setting values have been changed by the login user during the login (step S109). If the answer to step S109 is NO, the present process is completed. On the other hand, if one or more setting values have been changed during the login (YES to step S109), the CPU 101 returns the changed setting values to setting values before change that are recorded in the before change field 503 of the setting change history 402 (step S110), and completes the present process.

Step S110 corresponds to a setting value returning unit of this invention that returns, when a user logs out, setting values changed by the user during the login to setting values before change, which are stored in the storage unit (SRAM 103) of the image processing apparatus.

According to the first setting management process of FIG. 7, when a user logs in to the image processing apparatus 100, current setting values are changed based on the setting change history 402 associated with the login user. In a case where a setting value is changed by the login user during the login, a setting value before change is stored into the SRAM 103. When the user logs out, one or more setting values changed during the login are returned to setting values before change that are stored in the SRAM 103. It is therefore possible to improve the user-friendliness with a relatively simple construction without using an external storage device that is on a network.

Figure 8:
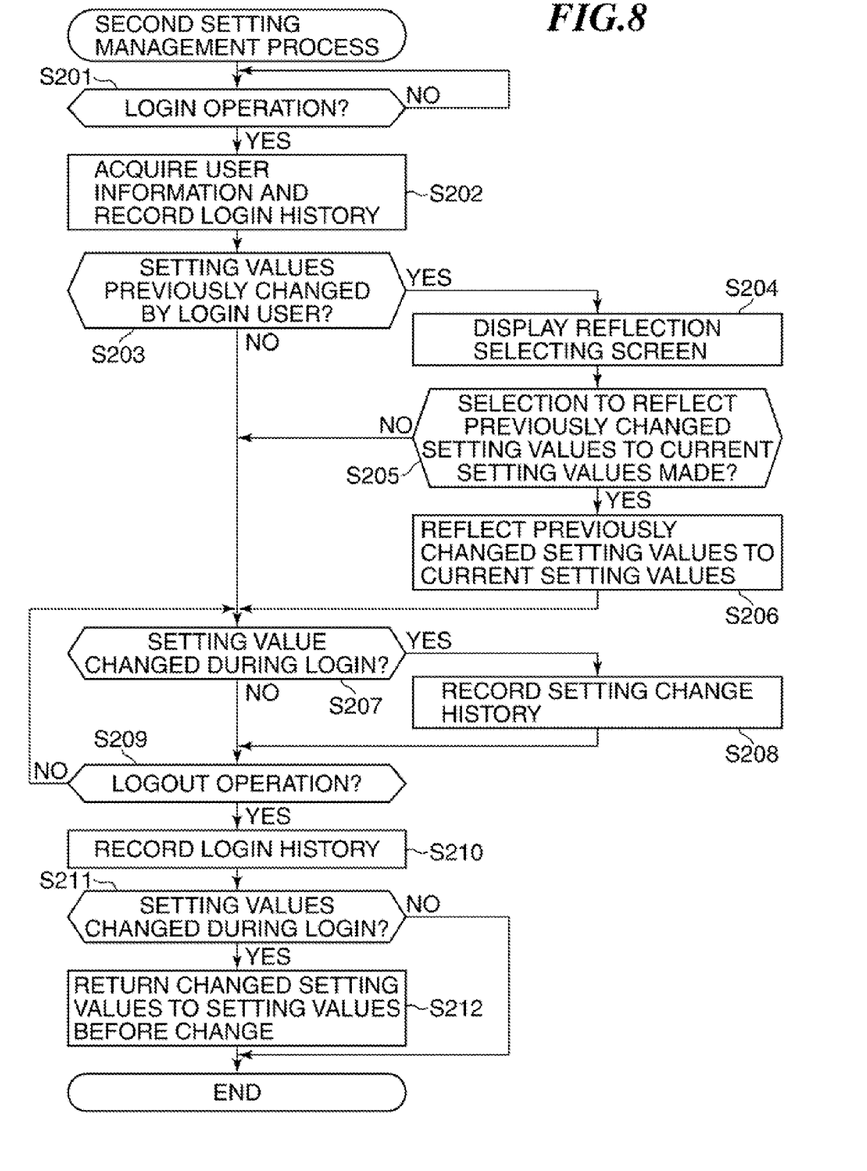
FIG. 8 is a flowchart showing the procedures of a second setting management process executed by the CPU of the image processing apparatus.

FIG. 8 shows in flowchart the procedures of a second setting management process executed by the CPU 101 of the image processing apparatus 100.

In steps S201 to S203 of FIG. 8, processing similar to that in steps S101 to S103 of FIG. 7 is performed. In brief, when a login operation is performed by a user (YES to step S201), the CPU 101 adds a new record to the login history 403, records a user identifier, information that represents whether the login user is an administrator, and current date/time information into respective ones of the user identifier field 601, administrator field 602, and login date/time field 603 of the new record (step S202), and determines whether or not the login user has changed one or more setting values during the previous login (step S203).

If the answer to step S203 is NO, the flow proceeds to step S207. On the other hand, if the login user has changed one or more setting values during the previous login (YES to step S203), the CPU 101 causes the touch panel device 201 to display a reflection selecting screen to enable the user to select whether or not the setting values previously changed by the login user should be reflected to current setting values (step S204).

Figure 9:
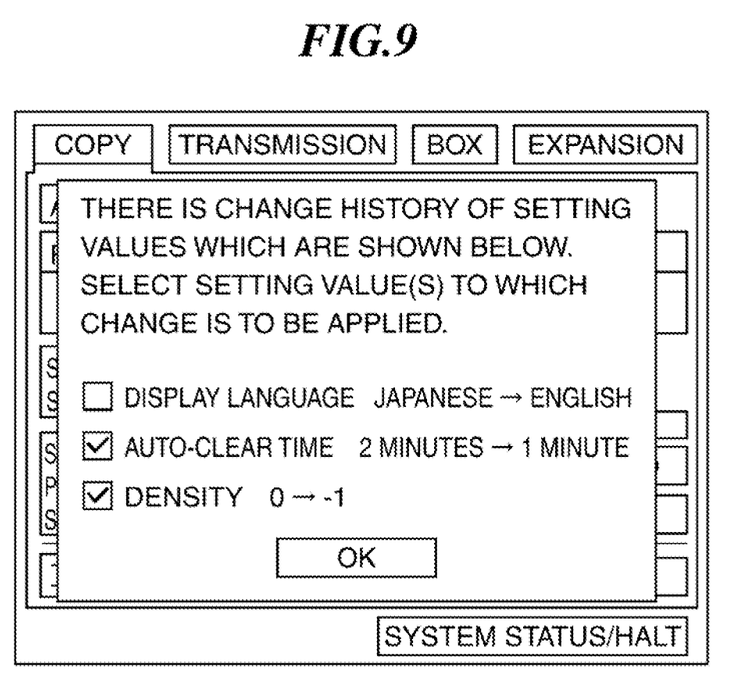
FIG. 9 is a view showing an example of a reflection selecting screen displayed on a touch panel device of the operation unit in the second setting management process.

FIG. 9 shows an example of the reflection selecting screen displayed on the touch panel device 201.

As shown in FIG. 9, setting items that can be changed (display language, auto-clear time, and density in the illustrated example) are displayed on the reflection selecting screen based on the setting change history 402 (FIG. 5) associated with a login user. Among the displayed setting items, the login user can select setting items to which setting change should be reflected at the next login by checking checkboxes corresponding thereto, whereby a customized environment can be realized with ease.

Next, the CPU 101 determines whether or not selection is made to reflect setting values previously changed by the login user to current setting values (step S205). If the answer to step S205 is NO, the flow proceeds to step S207. On the other hand, if the answer to step S205 is YES, the CPU 101 causes the setting values previously changed by the login user to be reflected on the current setting values (step S206), and proceeds to step S207. In this manner, the image processing apparatus 100 causes the user to select whether or not the current setting values should be changed. When selection is made to change the current setting values, the current setting values are changed to the setting values that are stored in the SRAM 103.

In steps S207 to S212, processing similar to that in steps S105 to S110 in FIG. 7 is performed. In brief, the CPU 101 determines whether or not the login user changes a setting value during the current login (step S207). If the answer to step S207 is YES, the CPU 101 records the setting change date/time, changed setting item, setting value before change, and setting value after change in respect of the changed setting value into the setting change history 402 (step S208), and proceeds to step S209.

On the other hand, if the answer to step S207 is NO, the CPU 101 determines whether or not a logout operation is performed by the user (step S209).

If the answer to step S209 is NO, the flow returns to step S207. On the other hand, if the answer to step S209 is YES, the CPU 101 records logout date/time information into the logout date/time field 604 of the login history 403 (step S210).

Next, the CPU 101 determines whether or not one or more setting values have been changed by the login user during the login (step S211). If the answer to step S211 is NO, the present process is completed. On the other hand, if the answer to step S211 is YES, the setting values changed during the login are returned to setting values before change that are recorded in the before change field 503 of the setting change history 402 (step S212), and the present process is completed.

According to the second setting management process, each individual user can selectively reflect desired one or more setting values to current setting values based on the setting change history 402 associated with the user, whereby the user-friendliness can be improved.

Figure 10:
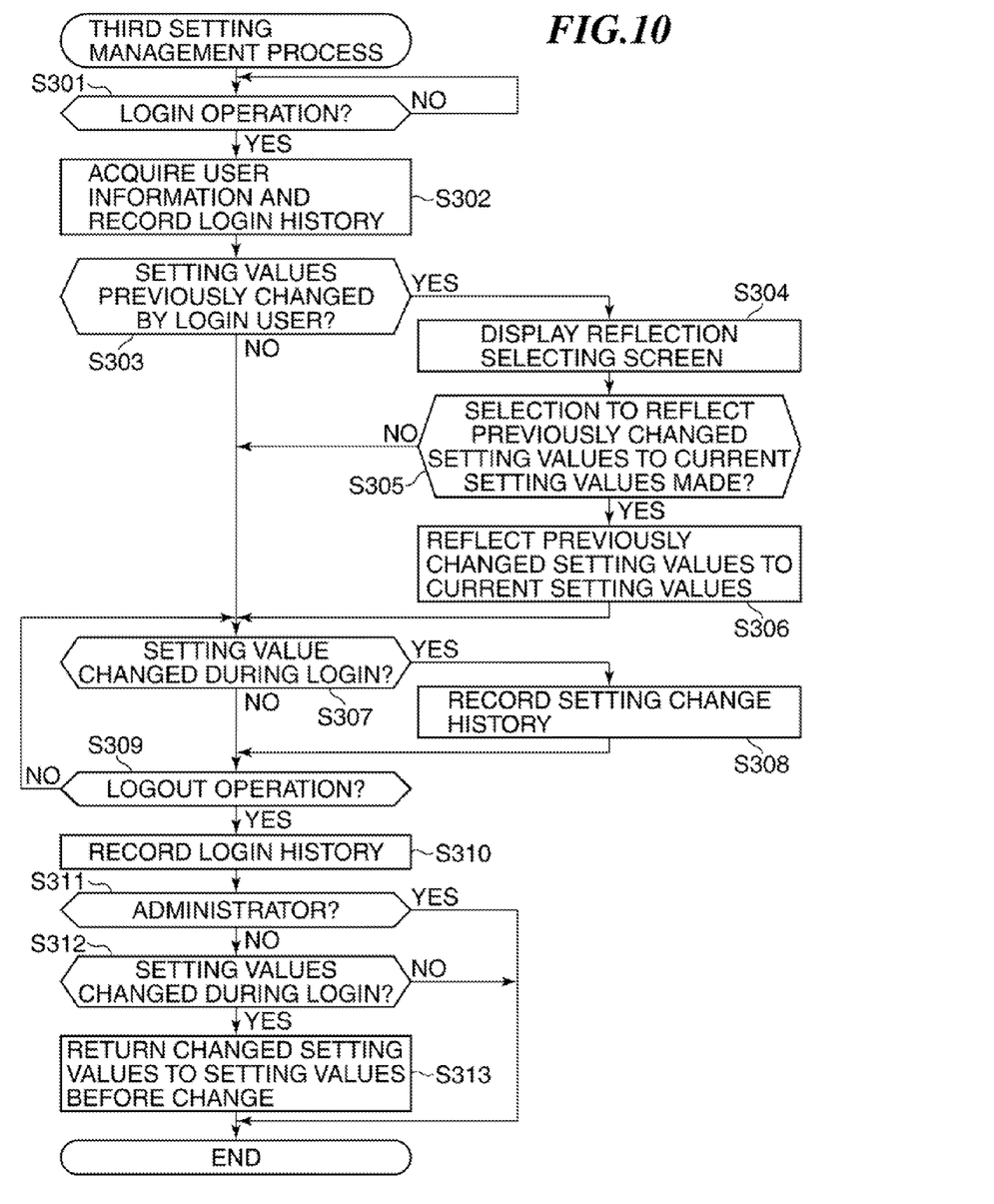
FIG. 10 is a flowchart showing the procedures of a third setting management process executed by the CPU of the image processing apparatus.

FIG. 10 shows in flowchart the procedures of a third setting management process executed by the CPU 101 of the image processing apparatus 100.

In steps S301 to S310 of FIG. 10, processing similar to that in steps S201 to S210 of FIG. 8 is performed. In brief, when a login operation is performed by a user (YES to step S301), the CPU 101 adds a new record to the login history 403, and records pieces of information into respective ones of the user identifier field 601, administrator field 602, and login date/time field 603 of the new record (step S302).

Next, the CPU 101 determines whether or not one or more setting values have been changed by the login user during the previous login (step S303). If the answer to step S303 is NO, the flow proceeds to step S307. On the other hand, if the answer to step S303 is YES, the reflection selecting screen of FIG. 9 is displayed on the touch panel device 201 (step S304).

Next, the CPU 101 determines whether or not selection is made to reflect setting values previously changed by the login user to current setting values (step S305). If the answer to step S305 is NO, the flow proceeds to step S307. On the other hand, if the answer to step S305 is YES, the CPU 101 causes the setting values previously changed by the login user to be reflected to the current setting values (step S306), and determines whether or not a setting value is changed by the login user during the current login (step S307).

If the answer to step S307 is YES, the CPU 101 records the setting change date/time, changed setting item, setting value before change, and setting value after change in respect of the changed setting value into the setting change history 402 (step S308), and proceeds to step S309.

On the other hand, if the answer to step S307 is NO, the CPU 101 determines whether or not a logout operation is performed by the user (step S309).

If the answer to step S309 is NO, the flow returns to step S307. On the other hand, if the answer to step S309 is YES, the CPU 101 records logout date/time information into the logout date/time field 604 of the login history 403 (step S310).

Next, the CPU 101 determines whether or not the user who is logging in is an administrator, while referring to information held in the administrator field 602 of the record, which corresponds to the login user, in the login history 403 shown in FIG. 6 (step S311). If the answer to step S311 is YES, the present process is completed. In other words, when the administrator who is logging in to the image processing apparatus 100 changes one or more setting values during the login, the changed setting values are not returned to the setting values before change that are stored in the SRAM 103.

On the other hand, if the answer to step S311 is NO, i.e., if the user who is now logging in is not an administrator, the CPU 101 determines whether or not one or more setting values have been changed by the login user during the login (step S312).

If the answer to step S312 is NO, the present process is completed. On the other hand, if the answer to step S312 is YES, i.e., one or more setting values have been changed by a general user during the login, the CPU 101 returns the changed setting values to setting values before change that are recorded in the before change field 503 of the setting change history 402 (step S313), and completes the present process.

According to the third setting management process, each individual user can selectively reflect desired one or more setting value to current setting values based on the setting change history 402 associated with the user, whereby the user-friendliness can be improved. Further, the setting change performed by the administrator can be reflected on setting values that are to be used when a general user subsequently logs in, thus making it possible to operate the image processing apparatus 100 according to the intention of the administrator.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-032759, filed Feb. 17, 2012, which is hereby incorporated by reference herein in its entirety.

What is claimed is:

1. An image processing apparatus comprising:
   a storage unit configured to store at least one setting value for an operation mode of the image processing apparatus;
   a log-in processing unit configured to enable a first type of user or a second type of user to log in to the image processing apparatus;
   a setting unit configured to set the operation mode based on the setting value stored in said storage unit, in response to the user's login to the image processing apparatus;
   a first determination unit configured to determine whether or not the setting value is changed by the user;
   a second determination unit configured to determine whether or not the user is the first type of user or the second type of user; and
   a control unit configured to replace, in a case where said first determination unit determines that the setting value is changed by the user and said second determination unit determines that the user is the first type of user, the changed setting value with a setting value which had been stored in said storage unit before the user's login, in response to the user's log out from the image processing apparatus,
   wherein said control unit is configured to maintain the changed setting value in a case where said first determination unit determines that the setting value is changed by the user and said second determination unit determines that the user is the second type of user.

2. The image processing apparatus according to claim 1, wherein said storage unit further stores login and logout times of the login user.

3. The image processing apparatus according to claim 1, wherein the storage unit is configured, in a case where the setting value is changed by the user, to store as a setting history a history that represents a change of the setting value.

4. The image processing apparatus according to claim 3, further comprising:
   an obtaining unit configured, in a case where the user has changed in the past the setting value stored in said storage unit, to obtain the setting value corresponding to the login user from said storage unit; and
   wherein said setting unit is configured to set a current operation mode of the image processing apparatus based on the setting value and the setting history obtained by said obtaining unit.

5. The image processing apparatus according to claim 4, further comprising:
   a display unit configured to display a screen on which selection is made whether or not an operation mode that is based on a setting history obtained by said obtaining unit is to be set as the current operation mode,
   wherein in a case where the selection is made on the screen displayed by said display unit to set as the current operation mode the operation mode that is based on the setting history, said setting unit sets as the current operation mode the operation mode that is based on the setting history obtained by said obtaining unit.

6. The image processing apparatus according to claim 4, wherein the setting history at least includes a time where the setting value was changed, the setting value before change, and the setting value after change.

7. The image processing apparatus according to claim 1, wherein the setting value includes display language.

8. The image processing apparatus according to claim 1, wherein the setting value includes density to be set in a printer function.

9. The image processing apparatus according to claim 1, wherein the setting value includes color, file format, and resolution to be set in communication function.

10. The image processing apparatus according to claim 1, wherein the first type of user is a non-administrator user.

11. The image processing apparatus according to claim 1, wherein the second type of user is an administrator user.

12. A control method for an image processing apparatus, comprising the steps of:
   storing into a storage unit at least one setting value for an operation mode of the image processing apparatus;
   enabling a first type of user or a second type of user to log in to the image processing apparatus;
   setting the operation mode based on the setting value stored in said storage unit, in response to the user's login to the image processing apparatus;
   determining, whether or not the setting value is changed by the user;
   determining whether or not the user is the first type of user or the second type of user; and replacing, in a case where it has been determined that the setting value is changed by the user and that the user is the first type of user, the changed setting value with a setting value which had been stored in said storage unit before the user's login, in response to the user's log out from the image processing apparatus, wherein the changed setting value is maintained in a case where it has been determined that the setting value is changed by the user and that the user is the second type of user.

13. A non-transitory computer-readable storage medium storing a program for causing a computer to execute a control method for an image processing apparatus, comprising the steps of:

storing into a storage unit at least one setting value for an operation mode of the image processing apparatus;

enabling a first type of user or a second type of user to log in to the image processing apparatus;

setting the operation mode based on the setting value stored in said storage unit, in response to the user's login to the image processing apparatus;

determining, whether or not the setting value is changed by the user;

determining whether or not the user is the first type of user or the second type of; and replacing, in a case where it has been determined that the setting value is changed by the user and that the user is the first type of user, the changed setting value with a setting value which had been stored in said storage unit before the user's login, in response to the user's log out from the image processing apparatus, wherein the changed setting value is maintained in a case where it has been determined that the setting value is changed by the user and that the user is the second type of user.

* * * * *